Sept. 12, 1961 R. HENATSCH 2,999,903

CALL TRANSMITTING DEVICES

Filed Nov. 7, 1957

INVENTOR.

Reynold Henatsch

United States Patent Office 2,999,903

Patented Sept. 12, 1961

2,999,903

CALL TRANSMITTING DEVICES

Reynold Henatsch, 300 E. 61st St., New York, N.Y.

Filed Nov. 7, 1957, Ser. No. 694,979

5 Claims. (Cl. 179—90)

This invention relates to a call transmitting device of the type used for transmitting sets of electrical impulses for controlling the operation of switches in an automatic telephone exchange for establishing telephone connections.

It refers to a system in which a series of numbers or a combination of letters and numbers must be registered successively on an impulse-transmitting device which sends them to a central office in order to establish a desired connection.

A well-known device, commonly referred to as a "dial telephone" is at present in common use for this purpose. This device utilizes a finger-hole disk for the purpose of selecting and registering the characters chosen. Although extensively used, this system has a number of draw-backs which I believe can be eliminated to give the public a more efficient telephone service. In this system it is necessary to insert one finger or some substitute article in a selected hole in order to revolve the disk in a clockwise direction until a fixed stopping point bars further progress of the finger. This action is necessary both to make the selection of the character desired and to place a tension on a spring which will revolve the disk in a counterclockwise direction as soon as the finger is removed. This return motion, which is controlled at a set governed speed, operates an impulse-transmitting mechanism and sends to the central office a number of impulses which corresponds to the number selected. Obviously, this system requires time for both the clockwise and the counterclockwise motions, the latter, as stated, being at a set governed speed. Furthermore, to allow for insertion of a finger, the characters are usually placed about ¼" below the finger-hole disk, in which position they are at times shaded and obscured, which makes for inaccurate dialing. It is recognized that in some cases larger dials are used, permitting the characters to be placed outside the holes instead of under them, but the revolving finger-hole disk is still necessary.

Winding up the spring of the finger-hole disk each time a character is to be registered is time-consuming and becomes tiring if a telephone is much used and often results in broken finger-nails, as well. Such fatigue and the blurring effect caused by the revolving disk which is in almost constant motion while a call is being made, are responsible for much lost time and inconvenience due to wrong numbers.

The use of a finger-hole disk dictates the arrangement of the characters and a type of construction which is not the most efficient. The disk must be about three inches in diameter to accommodate holes large enough for the insertion of a finger and at a certain fixed speed, a revolving disk of this size takes more time than that of a smaller disk which could be used if the necessity for finger-holes were eliminated.

The object of this invention is to disclose a new concept for such transmitting devices whereby all of the above enumerated deficiencies could be eliminated, thereby saving much time and making the process of telephoning easier and more efficient.

More specifically, I seek to accomplish my objects by utilizing push-button controls for making the selection of characters and instituting each registering operation; by performing the registering operation in a continuous forward motion and by pre-establishing and storing sufficient mechanical energy to perform the registering operation to establish at least one call.

It is to be understood that when I mention starting devices, it refers to push-buttons, keys or levers which are commonly used for such purpose.

Since I am not claiming the impulse transmitting mechanism nor the device for governing the speed, these elements are not shown in the drawings, but could be easily incorporated at the proper point by a qualified skilled mechanic.

Referring to the drawings.

Figures 1, 2, 3, 4, 6:
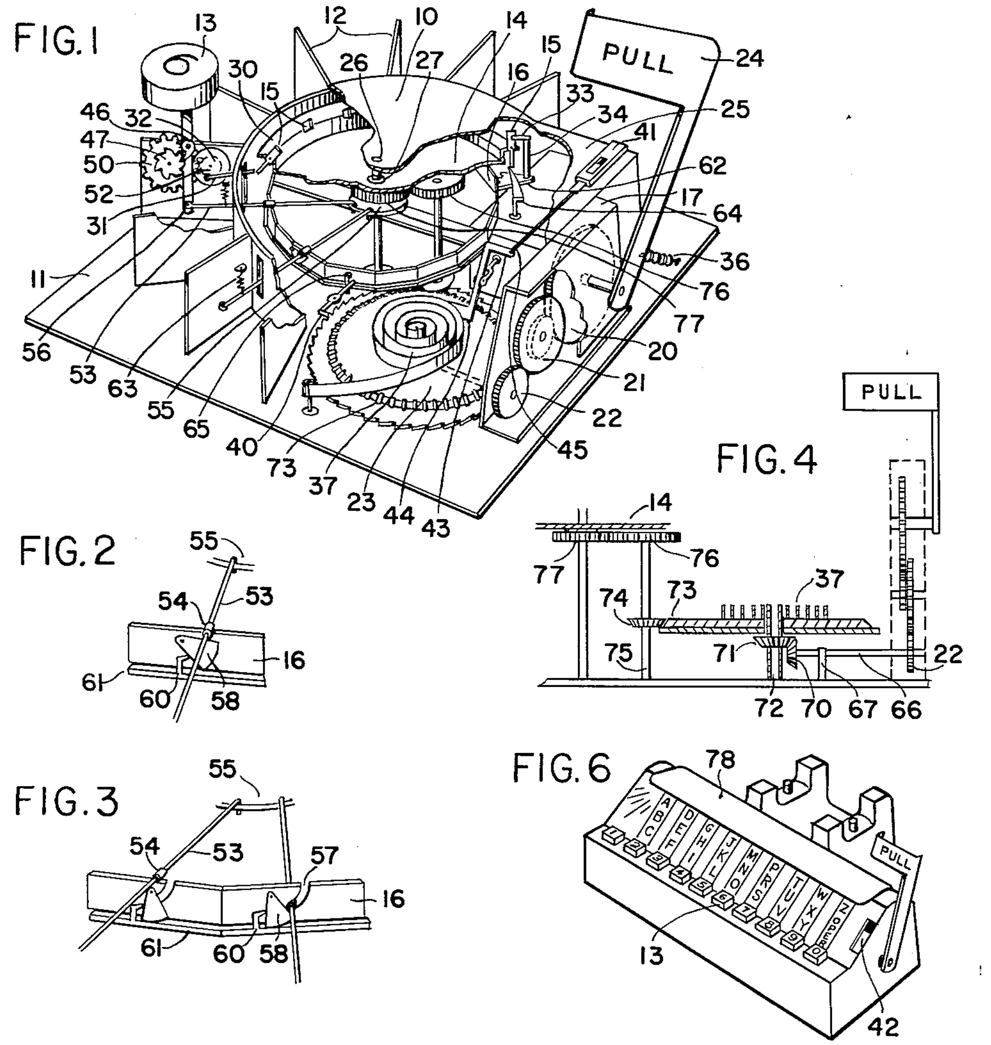
FIGURE 1 is a comprehensive perspective view of the call transmitter mechanism embodying the invention, with parts cut away to show the essential operating features and other parts omitted for the sake of clarity.
FIGURE 2 is an enlarged perspective view of a portion of the push-button locking mechanism, showing the push-button lever at the beginning of its action.
FIGURE 3 is an enlarged perspective view of the same mechanism, showing the manipulated push-button in locked position and illustrating how all the others are prevented from entering their slots.
FIGURE 4 is a side view partly in cross-section, illustrating how the drive-mechanism works.
FIGURE 6 is a perspective view of the outside of a telephone embodying the present invention, showing how radical changes in design can be made to improve telephone service.

A general idea of my concept may be had by referring to FIGURE 1, in which the main features are illustrated comprehensively. A main housing 10 is mounted on a base 11. On radial fins 12, attached to the main housing 10, are mounted push-buttons, of which 13 is a typical example. Within housing 10 is shown a revolving disk 14 which has tiltable levers or trips for the brake actuation 15 mounted adjacent to its outer edge and just below this disk is a co-axial wheel 16 which acts as a common starting and stopping and locking device for all of the push-buttons. Adjacent to the main housing 10 is a separate housing 17 in which is located a train of gears 20, 21, and 22, which when connected with the mainspring drive-wheel 23, comprise a spring-motor of which 24 is the handle.

The main housing 10, which is primarily of cylindrical shape, has a flat-sided extension 25 on one side to receive the spring-motor mechanism in close proximity. Centrally located in the cylindrical portion of the main housing is a shaft 26 which extends from the base 11 to the top of the housing. On this shaft 26 is mounted a bearing member 27 to which is attached the revolving disk 14 which has its central portion recessed to form a raised flange 30, on the outer edge of which is mounted at spaced intervals, a series of trips 15. Normally these trips are tilted toward the center of the disk 14 but when one is forced into upright position by the beam 31 of a trammel 32, it is in position to strike the arm 33 of the post 34 which acts as a connecting link to the impulse-transmitting mechanism. This post 34 is revolvably mounted on the top of a separate housing 35 intended to receive the impulse-transmitting mechanism which is not shown. The rotation of arm 33 at the top of post 34 could be made to convey to the impulse-transmitting mechanism the beginning and the end of the impulses to be transmitted for any chosen character.

In order to obviate the necessity of having a finger-hole disk, a convenient handle 24 is provided on the right side of the instrument. This handle is normally kept in position away from the operator by spring 36. When the handle is pulled forward, a pawl (not shown) engages the first wheel 20 of the train, causing it to set the entire train in action to wind up the main-spring 37 which is centrally located on the drive-wheel 23, as will be explained later. On being released, handle 24 is returned to its normal position by spring 36, the pawl disengaging it from the gears.

A spring-urged ratchet 40 adjacent to the edge of the drive-wheel 23 locks the wheel to retain the tension of the spring 37, thus storing the energy which is required to revolve disk 14 to register a character. When this energy is released, the drive-wheel is spring-urged in a clockwise direction, causing the trips 15 to be rotated in the same direction through a drive mechanism which will be explained later.

In order to inform the operator just how much mechanical energy is stored up in the drive-wheel, a conveniently placed gauge 41 near the handle 24 registers the amount. This gauge is made to be responsive to the expansion of the main-spring 37 which registers the amount of tension so as to be visible through a window 42 shown in FIGURE 5.

A lever, spring-hinged in its central portion to form an upper-arm 43 and a lower-arm 44, is arranged to keep the lower arm 44 in contact with the main-spring 37. As energy is used and the coiled main-spring unwinds, it causes the upper arm 43 to draw a small beam 45, having red on a portion of its outer extremity, through the gauge 41 to indicate the amount of energy stored up. When red shows in the gauge the operator can see at a glance that the coiled main-spring 37 must be re-energized. By using a suitable construction of the main-spring, it would be possible for an operator to pull the handle a few times in the morning and thus establish enough stored up energy to last throughout the entire day.

To operate the device to make a call, a series of letters and numbers is registered on the impulse-transmitting mechanism successively, in the usual manner, but instead of inserting a finger in a selected hole of a finger-hole disk, as is the customary manner, the handle 24 is first drawn forward to pre-establish sufficient mechanical energy, if the gauge shows the need for it, and then a series of push-buttons is manipulated successively.

This action is made clear by referring to FIGURE 1. For example, when push-button 13 bearing character 6 is depressed, a pawl 46 on the stem 56 engages a ratchet-wheel 47 attached to a spur-wheel 50 which is geared to a trammel 32 having a spur-wheel 52 attached to it at a ratio which causes the beam 31 attached to the trammel 51 to make one complete rotation. On the forward thrust it sets up a trip 15, which will register a number of impulses corresponding to the character on the push-button depressed. A lever 53 (shown enlarged in FIGURES 2 and 3) having a rotatable collar 54 in its central portion, is movably fastened at the inner end to a disk 55 which is attached to the shaft 26 at the center and has its outer end hinged to the lower portion of stem 56 of the push-button. Located just below the levers 53 is a coaxial wheel 16, the rim of which lies just beneath the rotatable collars 54 on levers 53. Along the upper edge of the rim are arcuate slots 57 which are large enough to receive the collars 54 of levers 53, one of said slots being located beneath each lever. Sectors 58 which act as rockers are movably attached on the outside of the rim of wheel 16 at each slot. When downward pressure on lever 53 causes sector 58 to rotate in a clockwise motion, a stop 60 located on a stationary base 61 just below wheel 16 urges the latter in a counterclockwise direction. This sidewise motion, coupled with the downward motion exerted by the push-button, causes the lever 53 to become locked in a depressed position until it is released, as will be explained later. While the wheel 16 is retained in a shifted position, none of the other levers is able to enter the slots, as is shown in FIGURE 3.

The counter-clockwise motion of wheel 16 is used for other purposes than locking the push-buttons as has been explained. A sector 62 similar to those on the rim of wheel 16, except that its arc has cogs which engage a cog (not shown) on the rim of wheel 16, is attached to the base of post 34 so that the counter-clockwise motion of wheel 16 rotates sector 62 which moves post 34 in a clockwise direction, carrying arm 33 with it. In this position, the impulse-transmitting mechanism is ready to receive a number of impulses corresponding to the character on the push-button depressed. When the trip 15 which was set up when the push-button was depressed reaches arm 33, the post 34 is revolved in a counter-clockwise direction, carrying with it the sector 62 fastened to its base. The cogs on the sector 62 engage the cog on the rim of wheel 16 at this point, forcing the wheel 16 in a clockwise direction until it reaches its original position, at which time the depressed lever is released by action of spring 63 and all of the slots on the rim of the wheel are again in position to receive any lever which is depressed. As the trip 15 forces arm 33 in a counter-clockwise direction, it indicates the end of the impulses for the character which was depressed and as soon as the trip 15, which is in an erect position, passes the arm 33, its lower extremity comes in contact with a wedge-shaped structure 64 which eases it into its normal tilted position.

In order to enable any push-button to start and stop the drive-wheel 23, wheel 16, which cooperates with all push-buttons, is equipped with a downward projecting arm 65 which comes in contact with the ratchet 40 which retains the tension of the drive-wheel. This pressure on the free end of the spring-urged ratchet 40 disengages the other end from the drive-wheel, allowing the latter to be spring-urged in a clockwise direction to turn the registering disk in a similar direction until the chosen trip reaches the post.

When wheel 16 is returned to its original position when the trip 15 reaches arm 33, as has been explained, the downward projecting arm 65 attached to it is thrown out of contact with ratchet 40 which is then spring-urged into a position which causes it to stop the motion of drive-wheel 23.

From the foregoing it will be noted that the impulses are communicated to the transmitting mechanism in a continuous clockwise motion, which eliminates the back and forth motion which is common practice at the present time. This is accomplished by having the trips bear no fixed relationship to any particular character. Whichever one is in line with the push-button selected will determine the number of impulses ticked off by the time the trip reaches the post 34. I believe a skilled mechanic could incorporate the necessary speed-regulating and governing device at a suitable place, once my concept is made known to him and the mechanism I am disclosing offers ample opportunity for cooperation with the impulse-transmitting mechanism which is not being claimed.

The driving-mechanism is explained in FIGURE 4. The extended axle 66 of spur-wheel 22 is supported from the base 11 by support 67, so that bevel-gear 70 which is attached to its further extremity with a pawl arrangement (not shown) is adjacent to the center of drive-wheel 23. Bevel-gear 70 cooperates with another bevel-gear 71 which is attached to axle 72 which passes through the center of drive-wheel 23, also with a pawl arrangement (which is not shown). When handle 24 is pulled, the pawl arrangements just mentioned cause coil-spring 37 to be wound up without moving the drive-wheel 23. However, when a push-button is depressed to release the stored up energy, the pawl arrangement in the axle 72 of drive-wheel 23 causes that wheel to be revolved in a clockwise direction as coil-spring 37 is urged to unwind. A bevel-rack 73 on drive-wheel 23 engages a bevel-gear 74 mounted on a jack-shaft 75, causing the shaft to revolve in a counter-clockwise direction, causing spur-wheel 76 which is mounted at the top to be revolved in the same direction. Spur-wheel 76 cooperates with spur-wheel 77 attached to the rotatable disk 14, causing it to move in a clockwise direction, as required for the registering process.

Figure 5:
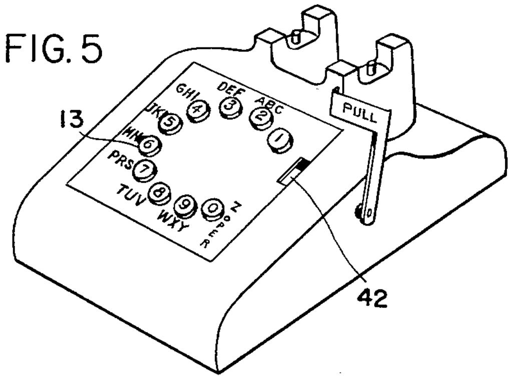
FIGURE 5 is a perspective view of the outside of a telephone embodying the present invention, showing how it can be adapted to conform to long established usage.

FIGURE 5 shows the general appearance of a telephone embodying my disclosure. Push-buttons 13, bearing the numerals are arranged to conform with long usage and letters are grouped beside them, as is now the practice in late models.

FIGURE 6 shows a radical departure from the old usage which was dictated by use of the finger-hole disk. Here the push-buttons 13 are arranged in a horizontal row, reading naturally from left to right, with the letters arranged in vertical rows just above the numerals. A conveniently placed light 78 illuminates the entire operating area.

Figure 7:
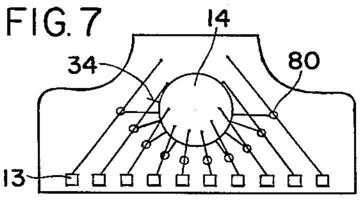
FIGURE 7 is a diagrammatical plan view of the telephone shown in FIGURE 6, showing how the basic circular registering mechanism can be utilized with a single horizontal row of push-buttons.

In FIGURE 7 is shown diagrammatically how my basic disclosure can be modified to fit such a design. The small registering disk 14, having registering devices evenly spaced all around it, is centrally located and the push-button mechanisms 80 are disposed in radial fashion around the lower half of disk. The stopping post 34 is located one space from character 1. To equalize the depression of the row of push-buttons, they are located on levers of varying length which cross points 80 in their central portion.

It is to be understood that I seek to protect a new concept for telephones by which the commonly used revolving finger-hole disk can be eliminated. During approximately forty-years in which the present dial telephones have been in use many users have become accustomed to the present arrangement. Therefore, to make my disclosure practical, I show in FIGURES 1–5 how it may be employed with little change in the present hand set and with no change in the present telephone equipment. FIGURES 6 and 7 are intended to illustrate one way in which my basic disclosure can be adapted to new and improved designs which would promote better telephone service.

What I claim is:

1. In a call transmitting system for driving a dial pulse means, a plurality of pushbuttons, each having a released position and an actuated position, there being one such pushbutton for each dial pulse character group, motor means, a rotatable disk urged in one direction of rotation by said motor, said disk being adapted to drive a dial pulse means to send dial pulses corresponding to the pushbutton which has been actuated, a plurality of trip means located equidistantly on the periphery of said disk, each trip means having two positions one of which renders it effectual and the other ineffectual, means coupling said plurality of pushbuttons to said plurality of trip means to render a selected trip means effectual, actuating means at a fixed point adjacent to the path of said trip means for intercepting said trip means in its effectual position, brake means for stopping the rotation of said disk, means coupling said actuating means to said brake means for stopping said disk when said effectual trip means reaches said fixed point, and starting means responsive to actuation of any pushbutton for releasing said brake means.

2. The call transmitting system of claim 1 wherein each of said coupling means is aligned with a trip means when said disk is stopped.

3. The call transmitting system of claim 1 wherein said motor is a spring motor, said motor having sufficient energy storage to turn said disk for a plurality of push-button actuations.

4. The call transmitting system of claim 3 wherein said motor has means for indicating the amount of energy stored therein.

5. In a call transmitting system for driving a dial pulse means, a plurality of pushbuttons, each having a released position and an actuated position, there being one such pushbutton for each dial pulse character group, motor means, a rotatable disk urged in one direction of rotation by said motor, said disk being adapted to drive a dial pulse means to send dial pulses corresponding to the pushbutton which has been actuated, a plurality of trip means located equidistantly on the periphery of said disk, each trip means having two positions one of which renders it effectual and the other ineffectual, means coupling said plurality of pushbuttons to said plurality of trip means to render a selected trip means effectual, actuating means at a fixed point adjacent to the path of said trip means for intercepting said trip means in its effectual position, brake means for stopping the rotation of said disk, means coupling said actuating means to said brake means for stopping said disk when said effectual trip means reaches said fixed point, means for restoring said intercepted trip means to its ineffectual position, starting means responsive to actuation of any pushbutton for releasing said brake means for blocking actuation of all of the starting means while said disk is in motion.

References Cited in the file of this patent

UNITED STATES PATENTS

| | | |
|---|---|---|
| 2,246,697 | Richard | June 24, 1941 |
| 2,389,247 | Dowey | Nov. 20, 1945 |